Sept. 24, 1968
A. B. MOJONNIER
3,402,523
FILLING MACHINE
Filed March 18, 1966
4 Sheets-Sheet 1
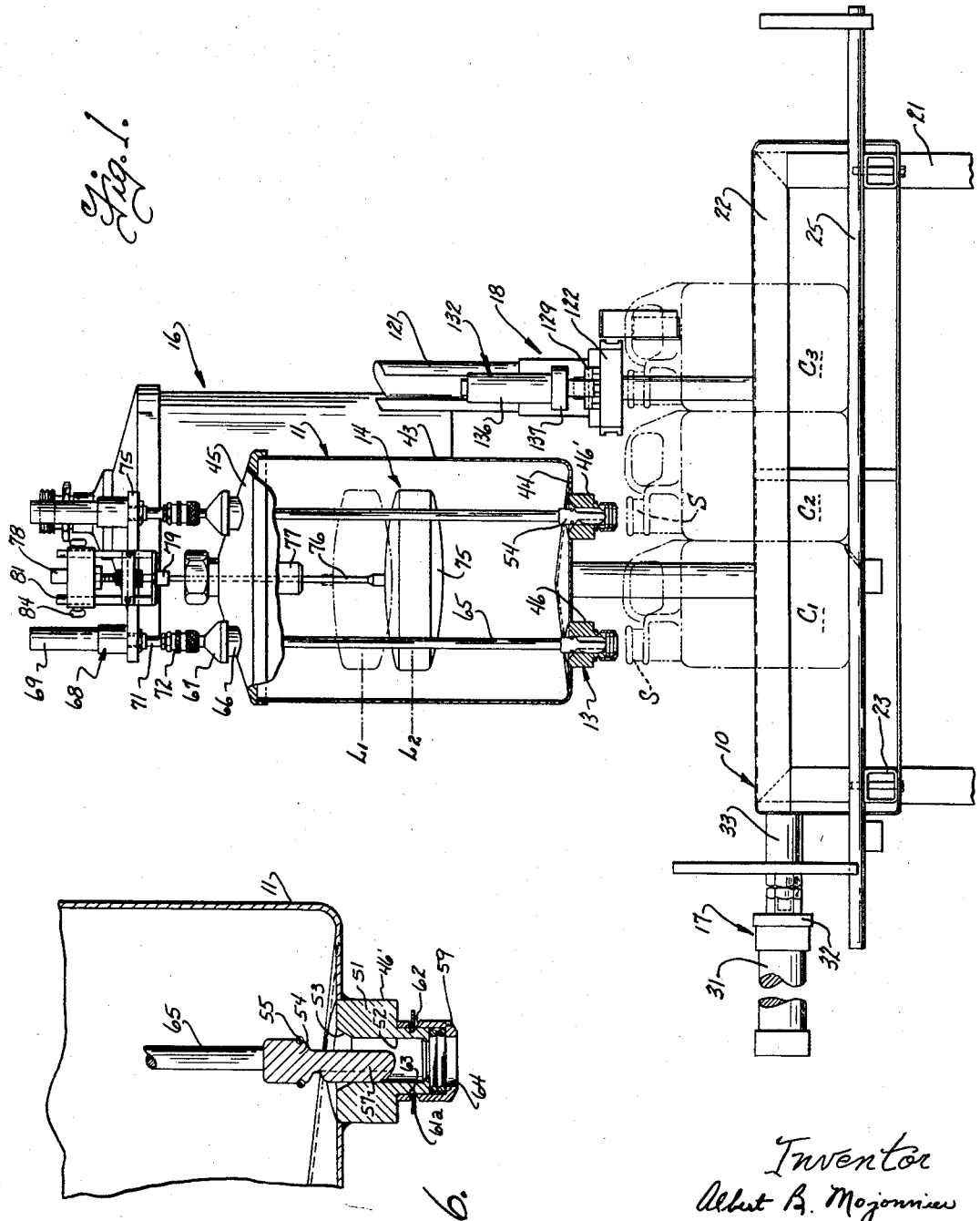
Inventor
Albert B. Mojonnier
By
McCanna, Morsbach + Pillote
Attorneys Sept. 24, 1968     A. B. MOJONNIER     3,402,523
FILLING MACHINE
Filed March 18, 1966     4 Sheets-Sheet 2
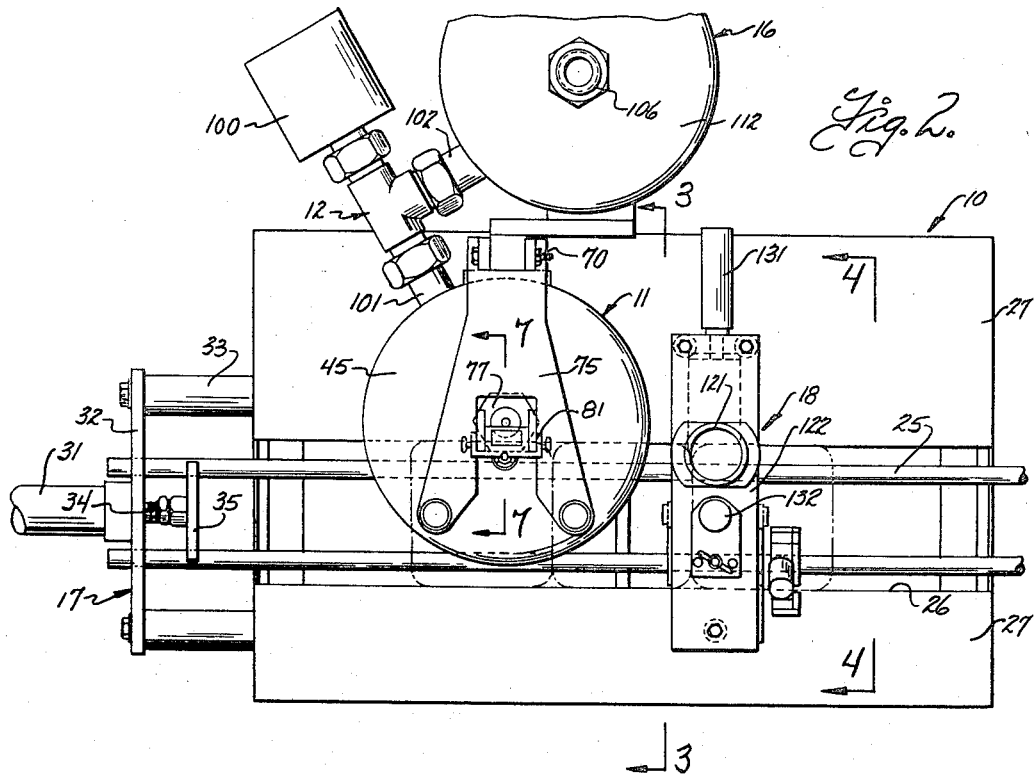
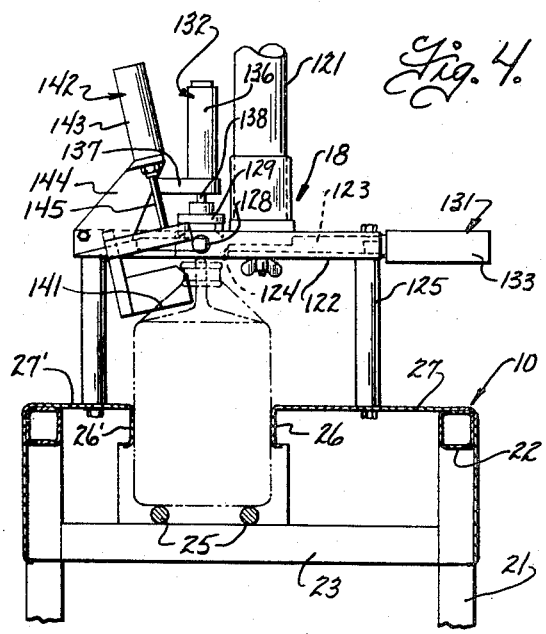
Inventor
Albert B. Mojonnier
by
McCanna, Marsbach & Pillote
Attorneys Sept. 24, 1968     A. B. MOJONNIER     3,402,523
FILLING MACHINE
Filed March 18, 1966     4 Sheets-Sheet 3
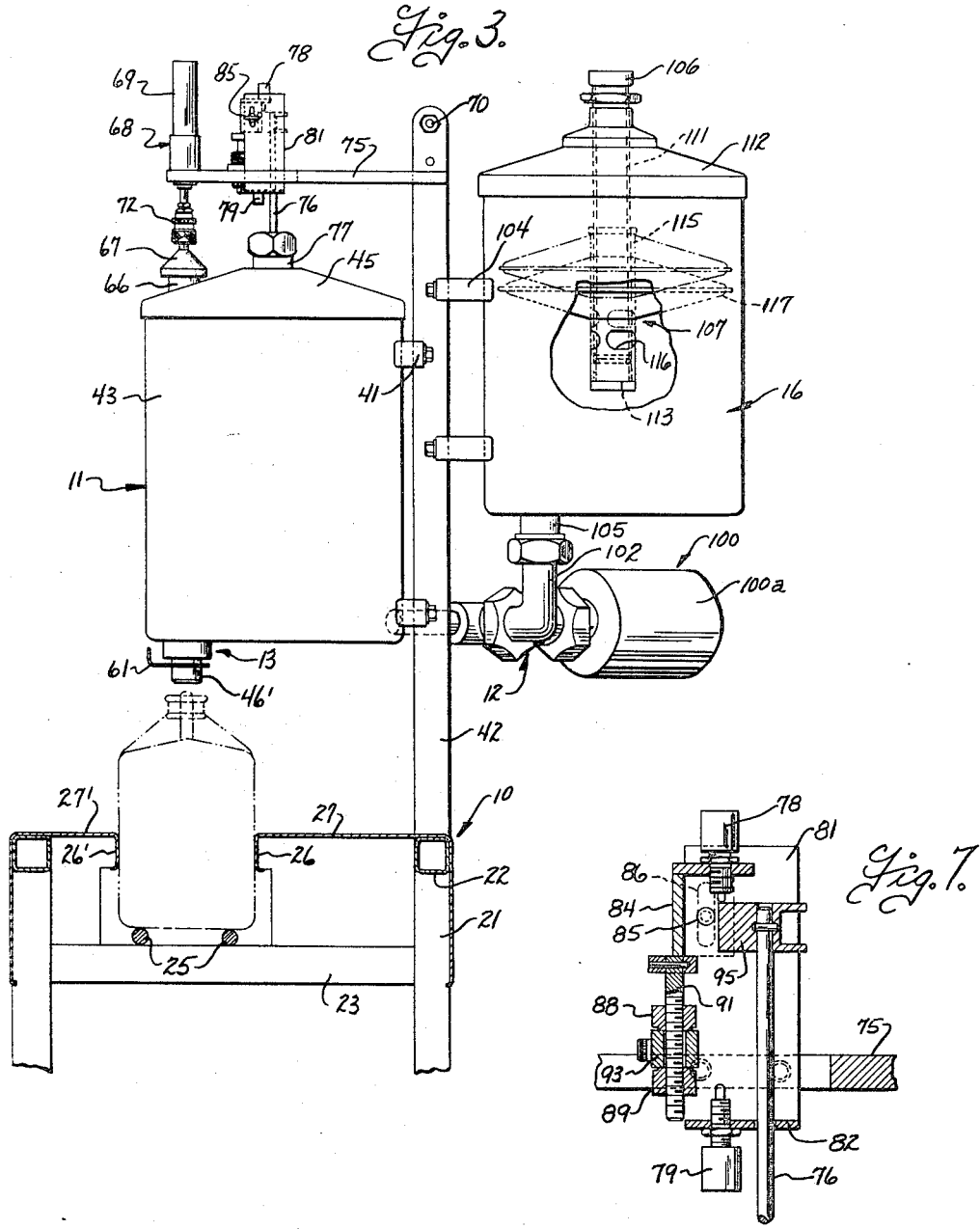
Inventor
Albert B. Mojonnier
By
McKenna, Mansback & Pillote
Attorneys United States Patent Office 3,402,523
Patented Sept. 24, 1968

3,402,523
FILLING MACHINE
Albert B. Mojonnier, Chicago, Ill., assignor to Albert Mojonnier, Inc., Franklin Park, Ill., a corporation of Illinois
Filed Mar. 18, 1966, Ser. No. 535,592
4 Claims. (Cl. 53—55)

ABSTRACT OF THE DISCLOSURE

A filling machine in which liquid is supplied to a measuring tank under the control of an inlet valve and is discharged from the measuring tank under the control of a discharge valve and the quantity of liquid dispensed is controlled by an upper and lower liquid level sensing mechanism that controls operation of the inlet and discharge valves to close the inlet valve when the liquid reaches a preselected upper level and to maintain the inlet valve closed during dispensing until the liquid reaches a preselected lower level. Operation of a pusher-type transfer mechanism for advancing containers to the filling machine is controlled by the liquid level sensing apparatus to prevent advancement of a succeeding container during dispensing until the liquid has dropped to a preselected lower level and an empty container is fed to the container advancing mechanism.

This invention relates to apparatus for dispensing measured quantities of liquid into containers.

Many commonly used apparatus for dispensing measured quantities of liquid into containers, such as vacuum type fillers, use the container itself as a measuring device to control the amount of liquid dispensed. Such fillers, however, are not suitable for use on certain containers which, because of size variation or flexibility in walls thereof, do not maintain an accurate volume. The present invention is directed to liquid dispensing apparatus of a type wherein the apparatus itself measures and controls the volume of liquid dispensed into the container so that the volume of fill in successive containers can be maintained constant, notwithstanding variations in size or shape of the containers.

It is accordingly an important object of this invention to provide an improved liquid dispensing apparatus which will accurately and repetitively dispense measured volumes of liquid into containers, independent of variations of size or shape of the containers being filled.

In container filling and closing machines, the filling time is often quite high as compared to the time required to perform the other operations such as closing or capping of the container. The fill time can, of course, be reduced by increasing the rate of flow of liquid during filling. However, in dispensing many liquids such as milk and the like, it is necessary to control the splash effect and/or foaming produced when the liquid is dispensed into the container.

Accordingly, another object of this invention is to provide an apparatus for dispensing a measured volume of liquid into containers, in which the velocity at which the liquid is dispensed into the container can be preselected to enable the rate of flow during the dispensing to be made an optimum, consistent with controlling splash effect and/or foaming of the liquid as it is dispensed into the container.

Another object of this invention is to provide a filling apparatus which will accurately dispense a preselected total volume of liquid into successive containers, and wherein portions of the total volume are dispensed into the containers at each of several successive stations to reduce the cycle time of the filling apparatus.

A more particular object of this invention is to provide a liquid dispensing apparatus wherein liquid is discharged from a measuring tank until the liquid level drops from a preselected upper level to a preselected lower level to thereby dispense a quantity of liquid into the container corresponding to the volume in the tank between the upper and lower levels, and wherein the measuring tank is thereafter refilled preparatory to a subsequent dispensing cycle.

A further object of this invention is to provide a filling apparatus in accordance with the foregoing object having an improved control system which prevents dispensing of liquid from the tank during refilling of the same and which also prevents refilling of the tank during dispensing.

Yet another object of this invention is to provide an apparatus for dispensing measured quantities of liquid which can be easily and readily cleaned and maintained in a sanitary condition.

These, together with other objects and advantages of the invention will become apparent from the following detailed description when taken in connection with the accompanying drawings wherein:

FIGURE 1 is a front elevational view of a filling machine embodying the invention, with parts broken away and shown in section to illustrate details of construction;

FIG. 2 is a top plan view of the filling machine;

FIG. 3 is a vertical sectional view taken on the plane 3—3 of FIG. 2;

FIG. 4 is a fragmentary sectional view taken on the plane 4—4 of FIG. 2;

FIG. 6 is a fragmentary view illustrating a dispensing nozzle and valve on a larger scale; and FIG. 7 is a fragmentary sectional view taken on the plane 7—7 of FIG. 2.

Figure 5:
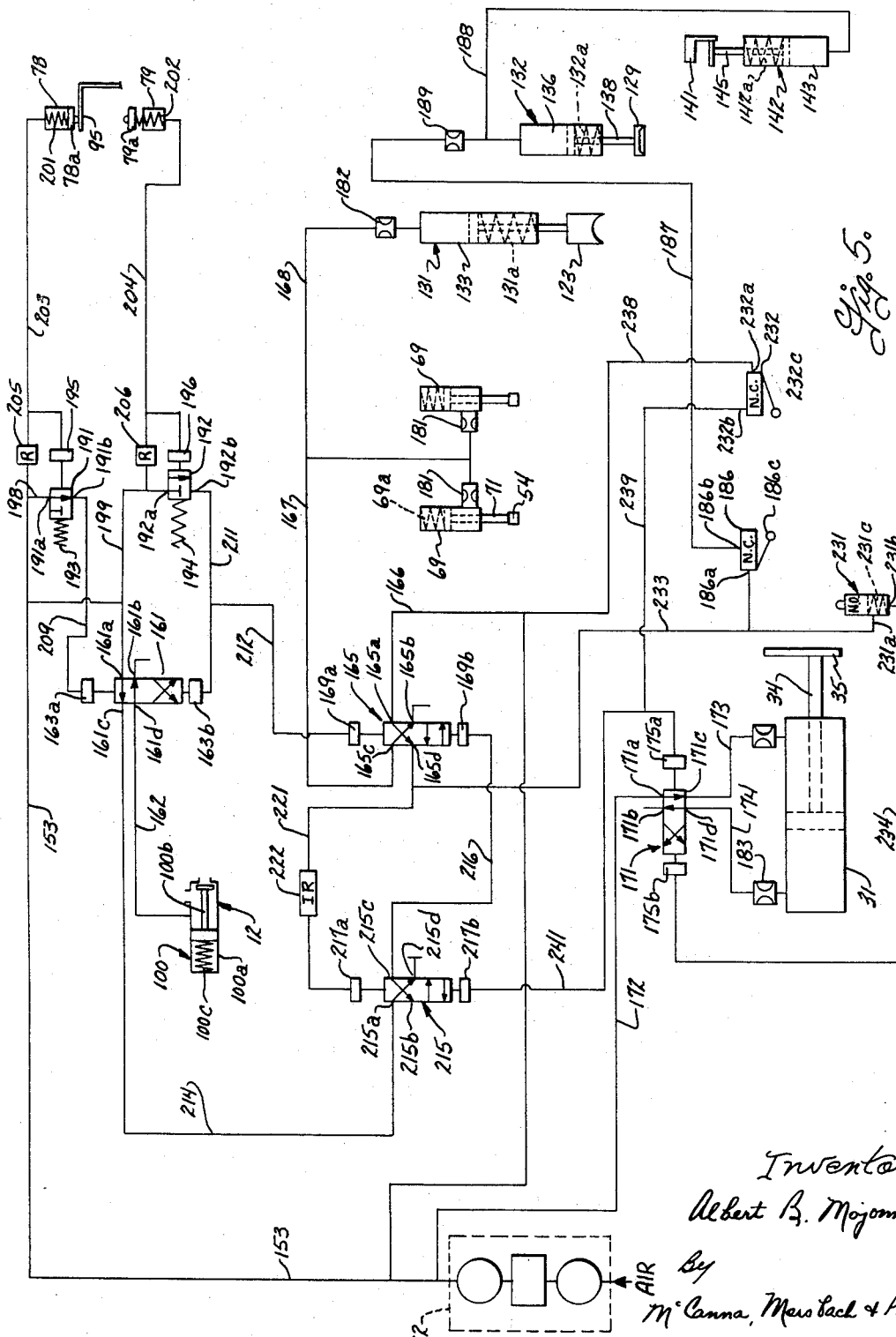
FIG. 5 is a schematic diagram illustrating the control system for the filling machine.

The filling machine of the present invention in general comprises a support frame 10 having a measuring tank 11, and inlet and discharge valve mechanisms 12 and 13 for controlling the flow of liquid into and out of the measuring tank. A liquid level sensing apparatus 14 is provided for sensing preselected upper and lower liquid levels in the tank to control the quantity of liquid dispensed. Liquid is preferably supplied to the measuring tank from a surge tank 16 under the control of the inlet valve 12, and a transfer mechanism 17 is provided for advancing containers from a loading station past the filling station and past a capping mechanism 18. A control system shown diagrammatically in FIG. 5 is provided to control dispensing, refilling and advancement of the container by the transfer mechanism in proper sequence.

The support frame 10 may be of any suitable construction and, as shown, includes support legs 21 and longitudinal and cross frame members 22 and 23. The transfer mechanism includes means for guiding the containers along a path below the filling and capping apparatus and, in the embodiment illustrated, includes support rails 25 which underlie and support the container as it is moved along a path, and laterally spaced guide rails 26 and 26' conveniently formed by downwardly extending flanges on the top members 27 and 27'. Various different transfer mechanisms may be provided for advancing the containers along the path. However, a pusher type transfer mechanism is advantageously employed for advancing the cartons in step fashion, with the cartons in end-wise embodying engagement. The pusher mechanism illustrated herein includes a reciprocable fluid operator having a cylinder 31 rigidly mounted on a cross head 32 carried by support members 33 on the frame 10. The cylinder has a piston and a rod 34 which is adjustably connected to a pusher 35 adjacent one end of the carton guides. Provision is made for adjusting the extended position of the pusher 35, to thereby control the positioning of the containers at the filling and capping stations. In the embodiment shown, the cylinder is of the type having a fixed stroke and the pusher 35 is adjustably connected to the piston rod 34 to enable limited adjustment of the pusher longitudinally along the rod to thereby control the extended position of the pusher. This is conveniently effected by a threaded adjustment of the pusher on the rod.

The measuring tank 11 may be supported in any suitable manner and, as shown, is mounted by bracket 41 on a post 42 secured to the main frame 10. As shown, the measuring tank includes a generally cylindrical side wall 43, a bottom wall 44 conveniently formed integrally with the side wall, and a cover 45 removably supported at the upper end of the side wall.

A discharge outlet means 13 is located in or adjacent to the bottom of the measuring tank. While a single outlet can be employed, at least two discharge outlets indicated at 46 and 46' are preferably provided with the outlets spaced apart in a direction paralleling the path of movement of the containers along the guides 26 a distance such that the two outlets can simultaneously deliver the liquid into two successive containers. When the transfer mechanism is of the type illustrated wherein the containers are disposed in end-wise embodying engagement, the outlets are spaced apart a distance corresponding to the spacing between the spouts designated S on successive containers indicated at C1 and C2 in FIG. 1. As best shown in FIG. 6, the discharge outlets include a spout body 51 having a discharge passage 52 therethrough. The upper end of the passage is preferably chamfered to form a valve seat, as indicated at 53. A discharge valve 54 is provided for controlling flow through the passage 52 and, as shown, the valve has an O-ring 55 arranged to engage the seat 53 to block flow through the passage, when the valve member is in its lowered position. The valve member is conveniently formed with a guide extension 57 which is slidably received in the passage 52, and which extension is fluted or otherwise cut away to permit discharge of liquid between the guide and passage, when the valve member and O-ring are raised above the seat 53. A nozzle member 59 is mounted on the spout body and is conveniently detachably secured thereto by a bifurcated locking key 61 having legs 61a which extend through slots 62 in the nozzle and into a groove 63 in the spout. The nozzle 59 has a discharge opening 64 aligned with the passage 52, and the size of the opening 64 is selected so as to control the rate of flow of liquid through the nozzle.

The valves 54 are conveniently operated from a point above the tank and, for this purpose, have rods 65 which extend upwardly through the tank and through guides 66 in the top of the tank. Drip shields 67 are provided on the rods externally of the tank to inhibit foreign material into the tank around the rods and valve actuators 68 are operatively connected to the rods to open and close the valves. The valve actuators advantageously comprise fluid cylinders 69 having pistons and rods 71 adjustably connected to the valve operating rods 65, as by couplings 72. In the embodiment shown, the fluid actuators are supported on a generally Y-shaped bracket 75 rigidly secured at 70 to the upper end of the support post 42.

A means is provided for sensing when the liquid in the tank reaches preselected upper and lower levels indicated at L1 and L2 in FIG. 1. This means conveniently comprises a float designated 75 disposed in the tank and having float guide rod 76 extending out of the tank through a guide bushing 77 in the tank cover 45. Upper and lower liquid level sensors designated 78 and 79 are arranged to cooperate with the float rod to be actuated thereby when the liquid reaches the aforedescribed upper and lower levels L1 and L2. The liquid level sensors are conveniently mounted on the support bracket 75 and at least one of the sensors is advantageously made vertically adjustable so as to enable the adjustment of the quantity of liquid dispensed by the apparatus. For this purpose, spaced generally vertically extending rails 81 are secured to the support bracket 75. As best shown in FIG. 7, the lower sensor is supported at a fixed position by a plate 82 secured to the lower ends of the rails. The upper sensor is vertically adjustable relative to the lower sensor and is mounted on slide block 84. The slide block is movable vertically along the rails 81 and thumb screws 85 extend through vertically elongated slots 86 in the slide block to releasably secure the slide block in adjusted position. Positive and accurate adjustment of the position of the slide block is achieved by upper and lower collars 88 and 89 which are threaded on a rod 91 secured to the slide block. The collars are arranged to engage opposite sides of a stationary abutment 93 which is fixed to the rails 81 so that adjusting of the collars can positively raise and lower the slide block and the upper sensor 78 carried thereby. The float rod 76 has a collar 95 rigidly secured to its upper end and which is arranged to actuate the upper and lower sensors when the float reaches the preselected upper and lower positions.

The measuring tank is refilled back to its upper level L1 after its dispensing cycle through the inlet or refill valve 12. The tank inlet indicated at 101 preferably communicates with the tank adjacent its lower end and the refill valve controls the flow of fluid into the tank through the refill inlet 101 from a supply line 102. The supply line 102 may communicate directly with the fluid supply source such as a reservoir. However, it is desirable to control the rate of flow of liquid into the measuring tank to enable accurate termination of the flow of liquid into the tank when the liquid reaches its preselected upper level. For this purpose, a surge tank 16 is advantageously employed in the supply line and a means such as a float valve provided in the surge tank to control the pressure or head on the liquid as it flows into the measuring tank. As shown, the surge tank 16 is conveniently mounted on the same support post 42 as by brackets 104. The surge tank has an outlet 105 connected to the refill valve inlet 102, and an inlet 106 adapted for connection to the liquid supply line. Any suitable float mechanism indicated at 107 may be provided in the surge tank to maintain a substantially constant liquid level or head therein. In the embodiment shown, the float mechanism includes a tube 111 secured to the surge tank cover 112 and communicating with the supply inlet 106. The tube 111 extends downwardly into the tank and is closed at its lower end as by a plug 113. The tube 111 has outlet openings above the plug and a sleeve 115 slidably surrounds the tube and has outlet openings 116 similar to those in the tube so as to allow discharge of fluid from the tube into the tank, when the openings in the sleeve register with those in the tube. A float member 117 is connected to the sleeve to raise and lower the latter with changes in liquid level. With this arrangement it will be seen that the openings 116 in the sleeve gradually move into and out of registry with those in the tube so as to progressively throttle the flow of liquid into the tank as the liquid level rises, and to progressively increase the flow of liquid into the tank as the liquid level drops. The plug 113 conveniently forms a shoulder at the lower end of the inlet tube to support the float in a lowered position in which the sleeve openings register with the tube openings.

After the containers are filled, they are advanced to a succeeding station wherein the container spouts are closed or capped by a capping mechanism 18. The capper may be of any conventional construction, details of construction of which will vary dependent upon the type of caps to be applied. In general, the capper includes a cap magazine 121 mounted on a capper body 122 and a slide 123 (FIG. 4) reciprocably mounted on the capper body for movement across the lower end of the magazine to feed caps from the magazine, one at a time, to a cap dispensing opening 124 in the capper body. The capper body is conveniently supported as by posts 125 on the top 27 of the support frame and a means such as resiliently biased fingers 128 are provided on the capper body and yieldably urged into engagement with the periphery of the cap to support the same in position over the opening 124, when the slide is retracted. A cap applying head 129 is mounted for movement through the opening 124 to press the cap onto the container spout. The feed slide 123 and the capper head are conveniently operated by fluid actuators indicated at 131 and 132 respectively. The actuator 131 includes a cylinder 133 supported at one end of the capper body 122 with the piston rod connected to the slide body to reciprocate the same. The fluid actuator 132 similarly includes a cylinder 136 supported as by a bracket 137 on the capper body, with the piston rod 138 connected to the capper head to move the same.

It is sometimes desirable to code or stamp the containers as they are filled and, for this purpose, a stamping head 141 is mounted for movement into and out of engagement with the container as they are capped. The stamper head is also conveniently operated by a fluid actuator 142 herein shown in the form of a cylinder 143 supported by a bracket 144 on the capper body and having its piston rod 145 connected to the stamping head 141 to move the same into and out of engagement with the container spout.

During dispensing, the discharge valves 13 are opened to dispense liquid from the measuring tank into the containers until the liquid level drops from the upper level L1 to the lower level L2. The inlet or refill valve 12 is thereafter opened to refill the measuring tank back up to the upper level L1. Provision is made for preventing opening of the inlet valve while liquid is being dispensed through the discharge valves and, in addition, provision is made for preventing opening of the discharge valves during refilling of the measuring tank. In addition, operation of the inlet and discharge valves is correlated with the operation of the transfer mechanism to prevent dispensing until after a container has been advanced into filling position.

In the control system diagrammatically shown in FIG. 5, the several actuators and the controls therefor are advantageously entirely air operated so as to obviate the necessity of supplying electrical energy to the filling apparatus, and thereby facilitating washing and cleaning of the apparatus. Air under pressure is supplied from a source (not shown) through a conventional pressure regulator, filter and lubricator indicated collectively at 152 to a pressure line 153. In the embodiment shown, the fluid actuator 100 for the refill valve 12 is of the single acting type and includes a cylinder 100a and piston having its rod 100b connected to the valve, together with a spring 100c which yieldably urges the piston in a direction to close the valve and block the flow to the measuring tank 11. The actuator 100 for the refill valve is operated under the control of a 4-way reversing valve 161 having a pressure inlet 161a connected to the pressure line 153, an exhaust outlet 161b, and controlled outlets 161c and 161d. One of the controlled outlets designated 161d is connected through a line 162 to the fluid actuator 100 to move the valve 12 to its open position when pressure is supplied to the actuator. Valve operators 163a and 163b, conveniently of the fluid actuated type, are provided for removing the reversing valve 161 from one position to the other.

The fluid actuators 69 for the discharge valves 54 are also conveniently of the single acting type and, as diagrammatically shown in FIG. 5, the actuator pistons are yieldably urged by springs 69a in a direction to normally close the discharge valves 54. A control valve 165, preferably of the 4-way flow reversing type, is provided for controlling the application of fluid pressure to the discharge valve actuator 69, and the valve 165 has a pressure inlet 165a, an exhaust outlet 165b, and controlled outlets 165c and 165d. The pressure inlet is connected as through a line 166 to the fluid pressure line 153 and one of the controlled outlets such as 165c is connected through a line 167 to the discharge valve actuators 69 to open the discharge valves when pressure is applied to the actuators. The fluid actuator 131 for the cap feed slide 123 is also preferably of the single acting type which is yieldably urged as by a spring 131a to a position to retract the feed slide. The controlled outlet 165c of the valve 165 is also conveniently connected through a line 168 to the actuator 131 to extend the feed slide when pressure is applied thereto.

The fluid actuator 31 for the carton pusher 35 is preferably of the double acting type and fluid pressure is reversibly supplied to the actuator 31 under the control of the valve 171. This valve is also of the 4-way flow reversing type and includes a pressure inlet 171a, an exhaust outlet 171b, and controlled outlets 171c and 171d. The pressure inlet is connected through a line 172 to the fluid pressure line 153 and the controlled outlets 171c and 171d are connected through lines 173 and 174 to opposite ends of the cylinder 31. The flow reversing valve 171 is moved from one position to the other by valve operators 175a and 175b, conveniently of the fluid actuated type, and the flow reversing valve 165 is similarly moved from one position to the other by valve operators 169a and 169b. Each of the 4-way reversing valves 161, 165 and 171, and their operators are of a type wherein the reversing valves are moved from one position to the other when a pulse of pressure is applied to one valve operator, the valves remaining in their moved position after the application of pressure to that operator is released, and until a pulse of pressure is applied to the other valve operator to return the valve to its first mentioned position. Flow regulating or speed controls indicated at 181, 182 and 183 are preferably provided for the fluid actuators 69, 131 and 31 to regulate the rate of movement of the discharge valves, feed slide and pusher. Such flow regulating or throttle valves are well known in the art and detailed description is deemed unnecessary.

The fluid actuators 132 and 142 for the capping head 129 and stamping head 141 respectively are also preferably of the single acting type. The capping head is yieldably urged to a retracted position by a spring 132a and the stamping head is similarly yieldably urged to a retracted position by a spring 142a. The capping and stamping heads are conveniently operated simultaneously under the control of a valve 186 having a pressure inlet 186a and an outlet 186b connected through the lines 187 and 188 to the fluid actuators for the capping and stamping heads. A flow regulator 189 is preferably provided in the line 187 to control the rate of flow hence the rate of movement of the capping and stamping heads.

The upper and lower liquid levels sensors 78 and 79 are arranged to operate the valves 161 and 165 to close the discharge valve 13 and open the refill valve 12, when the liquid drops to a preselected lower level L2, and to close the inlet valve 12 and open the discharge valves, when the liquid rises to the upper level L1. The sensors 78 and 79 could be of a type which is capable of directly operating the reversing valves 161 and 165. However, in order to achieve more accurate control of the upper and lower liquid levels, the sensors 78 and 79 are preferably in the form of pilots which operate under very light pressures, and which are connected through booster valves 191 and 192 to the flow reversing valves. As diagrammatically illustrated, the boosters 191 and 192 have pressure inlets 191a, 192a, and outlets 191b and 192b respectively. The booster valves are normally urged to their closed position as by springs 193 and 194 and have fluid operators 195 and 196 operative when pressure is applied thereto to move the respective valve to its open position. The inlets 191a and 192a are connected through lines 198 and 199 to the fluid pressure line 153. The sensors 78 and 79 are conveniently of the so-called "bleed" type wherein the valve members 78a and 79a are yieldably urged to their normally opened position as by springs 201 and 202 respectively. The valves 78 and 79 are connected through lines 203 and 204 to the fluid actuators 195 and 196 respectively, and fluid under pressure from the pressure line 153 is continuously supplied to the lines 203 and 204 through flow restrictors 205 and 206. The flow restrictors 205 and 206 are so arranged as to pass a restricted supply of air to the lines 203 and 204 and hence to the valves 78 and 79 and may be built into the booster valves in the form of a restricted flow passage. When the valves are open, the air which is passed through the restrictors to the pilots is vented to atmosphere so that no pressure can build up on the fluid operators 195 and 196. However, when either sensor valve 78 or 79 is closed, the pressure can build up in the respective line 203 and 204 and operate the actuator 195, 196 associated therewith.

The booster 191 has its outlet 191b connected through a line 209 to one of the valve actuators 163a for the valve 161. When the booster is moved to its open position shown in FIG. 5 in response to closing of the sensor 78, the valve operator 163a moves the valve 161 to the position shown in FIG. 5. The outlet 192b of booster 192 is connected through a line 211 to the other operator 163b of the valve 161, to thereby move the valve 161 to its other or flow reversing position, when the sensor valve 79 is closed. The booster outlet 192b of booster 192 is also connected through a line 212 to the operator 169a of valve 165, to move that valve to the position shown in FIG. 5, when the sensor valve 79 is closed.

The flow reversing valve 161, when in the position shown in FIG. 5, communicates the refill valve operator 100 to the exhaust outlet 161b so as to allow closing of the refill valve by spring 100c, and the valve 161 then applies pressure through line 214, interlock valve 215 and line 216 to the operator 169b for the valve 165. The interlock valve 215 is arranged to function as an on-off valve for controlling flow between lines 214 and 216, and as diagrammatically shown, is in the form of a 4-way reversing valve having a pressure inlet 215a, an exhaust outlet 215b, a control port 215c connected to the line 216, and a second control port 215d which is plugged or blocked. The valve 215 has fluid operators 217a and 217b and, when the valve is in the position shown in FIG. 5, it communicates the pressure port 215a with the blocked control port 215d to block flow through the line 214, and also communicates the control port 215c with the exhaust port 215b to communicate the line 216 and valve operator 169b to atmosphere.

The reversing valve 165, when in the position shown in FIG. 5, communicates the line 167 leading to the discharge valve operators and the feed cylinder operator 131 to atmosphere and applies pressure from line 166 to the control port 165d. For reasons which will become apparent from the following description, the controlled port 165d of this valve is connected through a line 221 and through an "impulse relay" 222 to the operator 217a for the valve 215. The impulse relay is of a known type such as the model 411 single impulse relay valve, manufactured by "Mead Fluid Dynamics." This valve transforms a steady air flow in the line 221 to an impulse which is applied to the valve operator 217a whenever pressure is applied to the line 221. The impulse relay then terminates pressure on the operator 217a so that the valve 215 can be moved from its closed position shown in FIG. 5 to its open position when the operator 217b is thereafter operated, even though pressure may still remain on the line 221.

The reversing valve 171 for the transfer mechanism is reversibly operated under the control of pilot valves 231 and 232. The pilot valve 231 has an inlet 231a connected through a line 233 to the controlled outlet port 165d of the valve 165. Valve 231 also has an outlet 231b connected through a line 234 to the valve operator 175b for valve 171. Valve 231 is of the normally open bleed type and is yieldably urged to its open position by a spring 231c, and the valve is positioned and arranged with relation to the transfer mechanism so as to be operated and moved to its closed position in response to positioning of an empty container in front of the pusher 35. Valve 232 has a pressure inlet 232a connected through a line 238 to the pressure supply line 153, and an outlet 232b connected through a line 239 to the other operator 175a of the valve 171. The outlet 232b of the valve 232 is also connected through a line 241 to the operator 217b of the interlock valve 215. Valve 232 is positioned with relation to the transfer mechanism so as to be actuated in response to extension of the transfer mechanism and positioning of the empty container at a position indicated at C1 in FIG. 1 below the filling station. The valve 232 is of the normally closed type and is moved to its open position when a container is moved into position below the filling nozzle and, preferably, the valve 232 has a one-way actuator 232c so arranged as to be operated only in response to forward movement of a container or the pusher. Valve 186 is arranged to be operated by retraction of the pusher. This valve has its inlet 186a connected through line 233 to the controlled outlet port 165d of the valve 165 so as to receive pressure when the valve 165 is in the position as shown in FIG. 5. Valve 186 is also of the normally closed type and preferably has a one-way actuator 186c so arranged as to be operated only during retraction of the pusher, to move the valve to its open position as the pusher approaches its fully retracted position.

The parts are shown in FIG. 5 in the positions assumed when the float actuator 95 engages the upper sensor 78 to close the same. As will be seen, closing of the upper sensor in response to movement of the float to its upper position, applies fluid pressure to the booster actuator 195 to open the booster valve and thereby apply pressure to the actuator 163a of the valve 161. This moves the valve 161 to the position shown in FIG. 5 and exhausts fluid pressure from the refill valve actuator 100 to close the refill valve 12. Simultaneously, the valve 161 applies pressure to line 214. However, the valve 215 is in its closed position under these conditions and flow through line 214 is cut off.

The pusher 35 can be moved to its extended position while the measuring tank is refilling, or immediately after the measuring tank has refilled, and as soon as a container is positioned in front of the pusher. Positioning of a container in front of the pusher closes the normally opened valve 231 and applies pressure from the line 233 to the valve operator 175b to move the valve 171 to a position to extend the pusher. As the pusher moves forward, it advances the container off the actuator for the valve 231 to allow the valve to return to its normally opened position and, as the pusher approaches its extended position, the valve 232 is operated from its normally closed to an opened position to thereby apply fluid pressure to the other valve operator 175a to reverse the pusher actuator 31 and retract the same. Simultaneously, valve 232 applies pressure to the operator 217b for the interlock valve and moves the interlock valve to its opened position. As the pusher is retracted, it actuates the valve 186 from its normally closed to an open position to thereby extend the capping and stamping heads.

When the interlock valve 215 is moved to its open position, it applies pressure to the operator 169b of the valve 165 and moves the same to a position cutting off flow to the controlled port 165d and applying pressure to the controlled port 165c and through lines 167 and 168 to the discharge valve operators 69 and cap feed operator 131, to open the discharge valve and extend the cap feed slide 123.

The actuator head 95 on the float moves downwardly as liquid is discharged from the measuring tank and, during discharge of fluid from the tank, the valve 161 remains in the position shown in FIG. 5 so as to hold the refill valve 12 in its closed position. When the float reaches the lower level L2, it operates the sensor 79 to close the same and this builds up pressure through line 204 to operate the booster actuator 196. This moves the booster 192 from its normally closed to an open position. When the booster 192 is moved to its open position, it applies pressure to the actuator 163b of valve 161 to move the same to a position in which it applies pressure to the refill valve actuator 100 to open the same, and simultaneously shut off flow to the line 214. In addition, the booster 192 when in an open position, applies pressure to the valve operator 169a of the valve 165 to return the valve to the position shown in FIG. 5. As will be seen, whenever the valve 165 is in a position to apply pressure to the discharge valve operator 169 to open the discharge valves, it blocks flow to the line 233 so that the pusher cannot be extended during discharge. However, as soon as the liquid reaches the lower level L2, the valve 165 is returned to the position shown in FIG. 5 so that the pusher can then be extended. It will therefore be seen that the transfer mechanism can automatically cycle as rapidly as the containers are filled.

As will be seen from FIG. 1, the filling apparatus maintains at least a minimum of level L2 in the measuring tank, which minimum provides a pressure head above the outlet orifice which is large as compared to the change in pressure head as the liquid drops from the upper level L1 to the lower level L2. Accordingly, the unit maintains a substantial pressure head on the liquid as it is discharged to provide relatively rapid flow. This rate of flow can be adjusted by changing the orifice size and, if desired, by changing the lower liquid level, to provide maximum rate of flow consistent with controlling splashing and foaming of the liquid as it is dispensed into the containers.

The use of two or more outlets and discharge valves effectively reduces the filling time by a factor corresponding to the number of outlets provided. The measured quantity of liquid corresponding to the volume in the measuring tank between the upper level L1 and the lower level L2 is simultaneously dispensed into several containers and, preferably, the nozzles are selected so that substantially like proportions are delivered into both containers. However, since each container successively passes under the first and second outlet orifices 46 and 46', successive containers will be repetitively filled with the same total volume of liquid, even if the orifices are slightly different so that more liquid flows through one orifice than the other. Thus, if slightly less than ½ of the liquid flows through the first orifice, the remaining portion will flow through the second orifice. Since the total volume dispensed during successive dispensing cycles is the same, the container which received less than ½ the total volume at the first outlet will receive greater than ½ of the total volume at the second outlet so that the overall volume is the same.

While a preferred embodiment of the invention is herein illustrated and described for purpose of illustrating the invention, it will be apparent to those skilled in the art that various changes and modifications may be made therein without departing from the spirit or scope of the invention.

I claim:

1. An apparatus for dispensing measured quantities of liquid into a container comprising, a tank having a supply inlet and a discharge outlet means, inlet valve means for controlling flow of liquid into the tank through the inlet, discharge valve means for controlling the flow of liquid from the tank through said outlet means, liquid level sensing means for sensing when the liquid in the tank falls to a preselected lower level above the outlet means and for sensing when the liquid in the tank rises to a preselected upper level above said lower level, means for advancing containers in step fashion past said outlet means, said container advancing means including means for guiding a row of containers in endwise abutting relation along a path below the discharge outlet means and a pusher mounted for extension and retraction along a path generally paralleling the guide means adjacent one end of the latter, a first sensing means operable in response to positioning of a container in front of the pusher, inlet valve operating means operatively connected to said liquid level sensing means and operative in response to filling of the tank to said preselected upper level for closing said inlet valve means and operative after the liquid drops to said preselected lower level for opening said inlet valve means, means operatively connected to said liquid level sensing means and to said first sensing means for operating said pusher to extend the same only after the liquid drops to said preselected lower level and a container is deposited in front of the pusher, a second sensing means for sensing when the pusher has extended and advanced a container into filling position below the discharge outlet means, discharge valve operating means operatively connected to said liquid level sensing means and to said second sensing means operative when both the liquid reaches said upper level and a container is moved into filling position for opening said discharge valve means and operative when the liquid drops to said preselected lower level for closing said discharge valve means to thereby dispense a measured quantity of liquid through the outlet means corresponding to the volume in the tank between said upper and lower levels, and means for preventing opening of said inlet valve means while said discharge valve means is open and for preventing opening of said discharge valve means while said inlet valve means is open.

2. An apparatus according to claim 1 wherein the discharge outlet means includes at least first and second outlets spaced apart along said path a distance corresponding to the spacing of successive containers whereby the containers are sequentially advanced past said first and second outlets, and said discharge valve means includes at least first and second discharge valves for controlling flow through the respective first and second outlets, said discharge valve operating means opening and closing said first and second discharge valves in unison.

3. An apparatus according to claim 1 including means for applying caps to containers as they are advanced along said path, and means for operating said cap applying means in response to retraction of the pusher.

4. An apparatus for dispensing measured quantities of liquid into containers comprising, a tank having a supply inlet and at least first and second discharge outlets, inlet valve means for controlling the flow of liquid into the tank through said inlet, discharge valve means for simultaneously controlling the flow of liquid through said first and second outlets, liquid level sensing means for sensing when the liquid in the tank falls to a preselected lower level above said outlets and for sensing when the liquid in the tank rises to a preselected upper level above said lower level, guide means for guiding a row of containers in endwise abutting relation along a path below said first and second outlets, a pusher mounted at one end of said guide means for extension and retraction along a path generally paralleling said guide means for intermittently advancing containers along a path past said first and second outlets in steps to position each container sequentially below said first and said second outlet, container sensing means operative in response to positioning of a container in front of the pusher, means operatively connected to said liquid level sensing means and responsive to filling of the tank to said preselected upper level for closing said inlet valve means and operative after the liquid in the tank drops to said preselected lower level for opening said inlet valve means, means operatively connected to said container sensing means and to said liquid level sensing means for extending said pusher only after the liquid drops to said preselected lower level and a container is positioned in front of the pusher, discharge valve operating means operatively connected to said liquid level sensing means and operative after the liquid reaches said preselected upper level for opening said discharge valve means and operative when the liquid drops to said preselected lower level for closing said discharge valve means to thereby dispense a measured quantity of liquid through said first and second outlets corresponding to the volume in said tank between said upper and lower levels, and means for preventing opening of said inlet valve means while said discharge valve means is open and for preventing opening of said discharge valve means while said inlet valve means is open.

References Cited

UNITED STATES PATENTS

| | | | |
|---|---|---|---|
| 2,666,565 | 1/1954 | Barnes et al. | 141—102 |
| 2,841,936 | 7/1958 | Mojonnier | 53—266 |
| 2,847,145 | 8/1958 | Brasile et al. | 222—67 |
| 2,957,606 | 10/1960 | Tarukawa | 222—450 X |
| 3,322,306 | 5/1967 | Munderich | 222—67 |

TRAVIS S. McGEHEE, *Primary Examiner.*

R. L. SPRUILL, *Assistant Examiner.*